(12) United States Patent
Wright et al.

(10) Patent No.: US 9,190,860 B2
(45) Date of Patent: Nov. 17, 2015

(54) SYSTEM AND METHODS FOR MANAGING A DEGRADED STATE OF A CAPACITOR SYSTEM

(71) Applicant: Maxwell Technologies, Inc., San Diego, CA (US)

(72) Inventors: Carl David Wright, Escondido, CA (US); Robert Shaw Lynds, San Diego, CA (US); John Michael Miller, Oakridge, TN (US)

(73) Assignee: Maxwell Technologies, Inc., San Diego, CA (US)

( * ) Notice: Subject to any disclaimer, the term of this patent is extended or adjusted under 35 U.S.C. 154(b) by 435 days.

(21) Appl. No.: 13/675,924

(22) Filed: Nov. 13, 2012

(65) Prior Publication Data

US 2013/0119923 A1    May 16, 2013

Related U.S. Application Data

(60) Provisional application No. 61/560,221, filed on Nov. 15, 2011, provisional application No. 61/560,227, filed on Nov. 15, 2011.

(51) Int. Cl.
*H01M 10/44* (2006.01)
*H01M 10/46* (2006.01)
(Continued)

(52) U.S. Cl.
CPC .............. *H02J 7/007* (2013.01); *H02J 7/0073* (2013.01); *H02J 7/0091* (2013.01); *H02J 7/345* (2013.01)

(58) Field of Classification Search
CPC ..... H02J 7/0014; H02J 7/0019; H02J 7/0091; H02J 7/047; H02J 7/1423; H02J 7/0047

USPC ......... 320/107, 116, 118, 119, 132, 150, 166, 320/167
See application file for complete search history.

(56) References Cited

U.S. PATENT DOCUMENTS

| 4,957,091 A | 9/1990 | Remmers |
| 5,041,776 A | 8/1991 | Shirata et al. |
| (Continued) | | |

FOREIGN PATENT DOCUMENTS

| CN | 101095275 A | 12/2007 |
| EP | 305347 | 3/1989 |
| (Continued) | | |

OTHER PUBLICATIONS

Basu, Supratim, "Voltage and Current Ripple Considerations for Improving Ultra-Capacitor Lifetime While Charging with Switch Mode Converters," Power Electronics and Applications (2007) 1-7.

*Primary Examiner* — Edward Tso
(74) *Attorney, Agent, or Firm* — Knobbe, Martens, Olson & Bear, LLP

(57) ABSTRACT

This disclosure provides systems, methods and apparatus for managing a capacitor system. In one aspect, an energy storage system includes a capacitor system, a charging circuit, and a controller. The capacitor system includes one or more capacitors. The charging circuit is configured to charge the capacitor system to a first target voltage. The controller is configured to detect a first condition and is programmed, in response to the first condition, to instruct the charging circuit to charge the capacitor system to a second target voltage that is less than the first target voltage. The controller is programmed to provide a notification that the capacitor system is operating in a degraded state.

49 Claims, 6 Drawing Sheets

(51) Int. Cl.
*H02J 7/00* (2006.01)
*H02J 7/34* (2006.01)

(56) References Cited

U.S. PATENT DOCUMENTS

| | | | |
|---|---|---|---|
| 5,146,095 A | 9/1992 | Tsuchiya et al. |
| 5,199,394 A | 4/1993 | Hartmann et al. |
| 5,256,956 A | 10/1993 | Tsuchiya et al. |
| 5,325,042 A | 6/1994 | Murugan |
| 5,387,859 A | 2/1995 | Eckenfelder et al. |
| 5,539,388 A | 7/1996 | Modgil |
| 5,563,454 A | 10/1996 | Araki et al. |
| 6,066,936 A | 5/2000 | Okamura |
| 6,075,378 A | 6/2000 | Okamura |
| 6,362,595 B1 | 3/2002 | Burke |
| 6,407,593 B1 | 6/2002 | Kawamoto et al. |
| 6,420,793 B1 | 7/2002 | Gale et al. |
| 6,788,027 B2 | 9/2004 | Malik |
| 6,819,010 B2 | 11/2004 | Burke |
| 6,861,767 B2 | 3/2005 | Amano et al. |
| 6,888,266 B2 | 5/2005 | Burke et al. |
| 6,988,476 B2 | 1/2006 | Solberg |
| 7,078,825 B2 | 7/2006 | Ebrahim et al. |
| 7,198,016 B2 | 4/2007 | Burke |
| 7,319,306 B1 | 1/2008 | Rydman et al. |
| 7,395,810 B2 | 7/2008 | Miyashita et al. |
| 7,471,068 B2 | 12/2008 | Cegnar |
| 7,573,151 B2 | 8/2009 | Acena et al. |
| 7,592,782 B2 | 9/2009 | Rydman et al. |
| 7,690,343 B2 | 4/2010 | Doljack |
| 7,806,095 B2 | 10/2010 | Cook et al. |
| 2002/0024322 A1 | 2/2002 | Burke |
| 2003/0067281 A1 | 4/2003 | Wilk et al. |
| 2007/0141411 A1 | 6/2007 | Meredith et al. |
| 2007/0216343 A1 | 9/2007 | Rozman et al. |
| 2008/0114501 A1 | 5/2008 | Wu |
| 2008/0136374 A1 | 6/2008 | Nelson et al. |
| 2008/0297231 A1 | 12/2008 | Riedel |
| 2009/0050092 A1 | 2/2009 | Handa et al. |
| 2009/0056661 A1 | 3/2009 | Cook et al. |
| 2009/0184692 A1 | 7/2009 | Owens |
| 2009/0261787 A1 | 10/2009 | Cegnar et al. |
| 2010/0194351 A1 | 8/2010 | Nagashima |
| 2011/0121793 A1* | 5/2011 | Liu .............................. 320/167 |
| 2011/0248670 A1 | 10/2011 | Yamazaki et al. |

FOREIGN PATENT DOCUMENTS

| | | |
|---|---|---|
| EP | 490088 | 6/1992 |
| EP | 1013506 | 11/2004 |
| EP | 2 112 739 | 10/2009 |
| EP | 2 128 960 | 12/2009 |
| EP | 2159409 | 3/2010 |
| GB | 2 452 130 | 2/2009 |
| JP | 09-308119 | 11/1997 |
| JP | 2008-35674 | 2/2008 |
| WO | WO 90/05405 | 5/1990 |
| WO | WO 90/06429 | 6/1990 |
| WO | WO 2009/055809 | 4/2009 |
| WO | WO 2009/092848 | 7/2009 |

* cited by examiner

SYSTEM AND METHODS FOR MANAGING A DEGRADED STATE OF A CAPACITOR SYSTEM

CROSS-REFERENCE TO RELATED APPLICATIONS

This application claims priority to U.S. Provisional Patent Application No. 61/560,221 filed Nov. 15, 2011 entitled "SYSTEM AND METHODS FOR MANAGING A DEGRADED STATE OF A CAPACITOR SYSTEM" and U.S. Provisional Patent Application No. 61/560,227 filed Nov. 15, 2011 entitled "SYSTEM AND METHODS FOR CONTROLLING VOLTAGE IN A CAPACITOR SYSTEM WITH RESPECT TO TEMPERATURE." The disclosures of these prior applications are considered part of and are incorporated by reference in, this disclosure in its entirety.

BACKGROUND

1. Field

The present disclosure relates generally to systems and methods for managing an energy storage system, such as a capacitor system. The disclosure relates more particularly to operating a capacitor system in a degraded state.

2. Description of the Related Art

Many different types of energy storage systems, such as systems including batteries or capacitors, are known. Such conventional energy storage systems may be implemented to provide power to another system, such as a starter motor in a commercial truck. These systems can be expensive to own and operate, and thus it is beneficial to reduce downtime that can occur due to a failure event that may occur related to an energy storage system.

However, when such a failure event occurs, conventional energy storage systems will generally become completely inoperable, which in turn can disable the devices being powered by the energy storage system.

SUMMARY

The systems, methods and devices of this disclosure each have several innovative aspects, no single one of which is solely responsible for the desirable attributes disclosed herein.

One innovative aspect of the subject matter described in this disclosure can be implemented in an energy storage system including a capacitor system, a charging circuit, and a controller. The capacitor system includes one or more capacitors. The charging circuit is configured to charge the capacitor system to a first target voltage. The controller is configured to detect a first condition and is programmed, in response to the first condition, to instruct the charging circuit to charge the capacitor system to a second target voltage that is less than the first target voltage. The controller provides a notification that the capacitor system is operating in a degraded state.

Another innovative aspect of the subject matter described in this disclosure can be implemented in a method of operating a capacitor-based energy storage system. The method includes providing a controller and a capacitor system comprising at least one capacitor. The method includes charging the at least one capacitor in the capacitor system with a charging circuit to a first target voltage. The method includes detecting a condition of the capacitor system with the controller. The method includes determining whether to put the capacitor system in a degraded state based on the condition. The method includes reducing the charge of the at least one capacitor to a second target voltage in response to the condition. The method includes providing a notification that the at least one capacitor is charged to the second target voltage.

Another innovative aspect of the subject matter described in this disclosure can be implemented in an energy storage system including a capacitor system, charging means, detection means, charge reduction means, and notification means. The capacitor system includes one or more capacitors. The charging means are for charging at least one capacitor in the capacitor system to a first target voltage. The detection means are for detecting a condition reflecting a degraded state of the capacitor system with the controller. The charge reduction means are for reducing the charge of the at least one capacitor to a second operating voltage in response to the condition. The notification means are for providing a notification that the at least one capacitor is charged to the second operating voltage.

Another innovative aspect of the subject matter described in this disclosure can be implemented in an energy storage system including a capacitor system, a charging circuit, and a controller. The capacitor system includes one or more capacitors. The circuit is configured to charge the capacitor system to a first target voltage. The controller is configured to detect a temperature condition of the capacitor system. The controller is programmed to charge the capacitor system to a second target voltage that varies as a function of temperature when the detected temperature condition is between an upper temperature condition and a lower temperature condition.

Details of one or more implementations of the subject matter described in this disclosure are set forth in the accompanying drawings and the description below. Although the examples provided in this disclosure are primarily described in terms of a vehicle system or an internal combustion engine system, the concepts provided herein may apply to other types of systems with or within which an energy storage system is implemented. Other features, aspects, and advantages will become apparent from the description, the drawings and the claims. Note that the relative dimensions of the following figures may not be drawn to scale.

BRIEF DESCRIPTION OF THE DRAWINGS

Like reference numbers and designations in the various drawings indicate like elements.

DESCRIPTION

Figure 1:
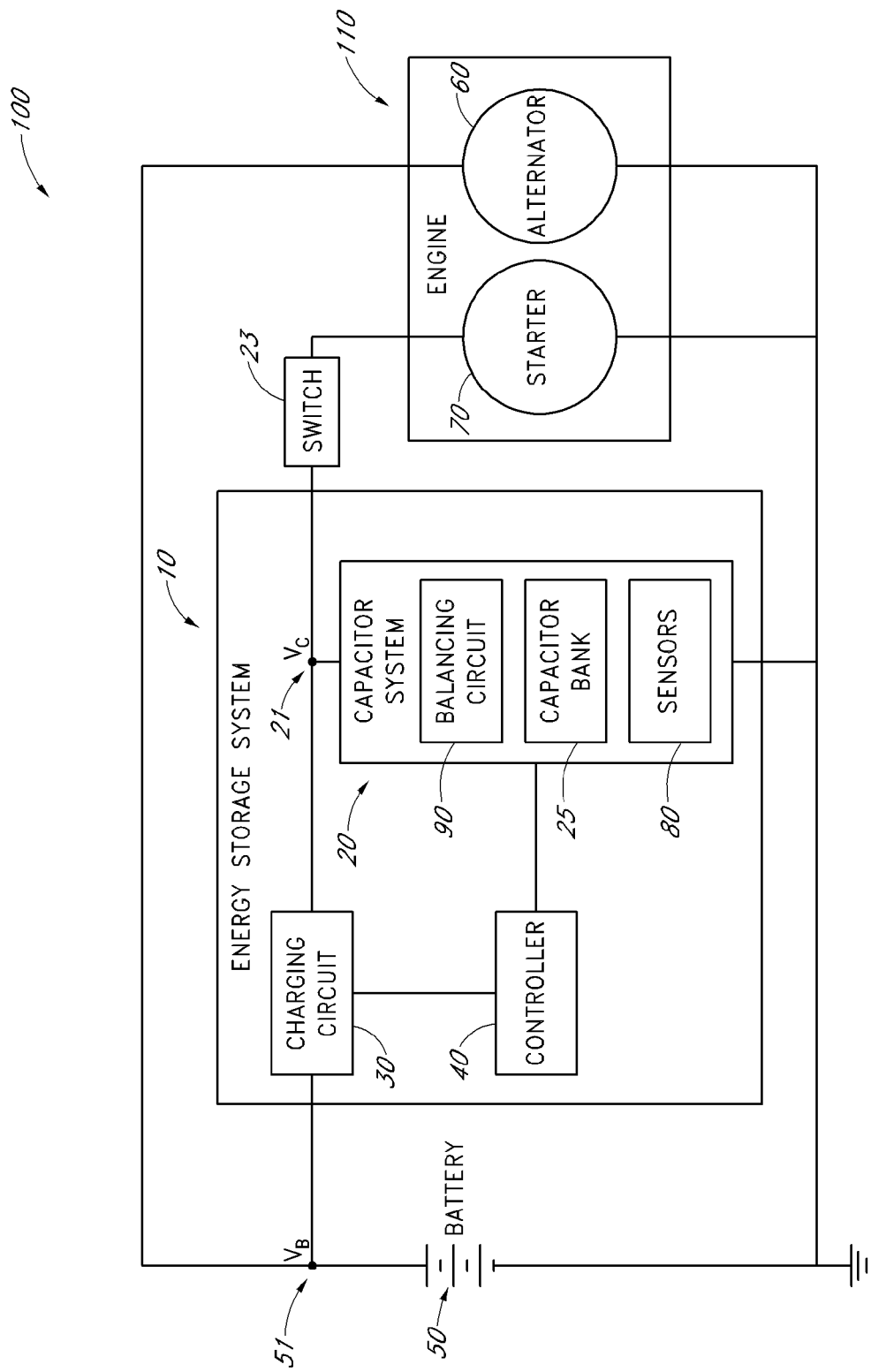
FIG. 1 is a schematic block diagram illustrating an embodiment of an energy storage system implemented within an internal combustion engine system.

Embodiments of the invention relate to systems and methods for managing a capacitor system to operate in a degraded state. In some embodiments, the capacitor system includes one or more capacitors, wherein pluralities of capacitors are arranged into a capacitor bank, or set. Embodiments of the invention described herein may include systems and methods for managing the efficient operation of a device that can provide capacitor-based power to a vehicle, such as a car or truck. For example, the device may include one or more banks of capacitors and be configured to provide starting engine power to a car or truck. In one embodiment, the device is configured to have only capacitors and be connected to one or more vehicular batteries that provide charging power to the capacitors. In another embodiment, the device itself includes batteries and capacitors in one integrated unit that can be mounted into a car or truck. The integrated unit may provide charging power to the vehicle by connecting it to the starter of the vehicle.

In one embodiment, the capacitor system may be configured to operate not only in a fully powered state, but also operate in a degraded power state wherein the capacitors within the system are not charged to their full potential. The system may charge the capacitors to a reduced power state in response to a detected event that could pose an increased risk of damage to the capacitor system. For example, the system may move into a degraded state wherein the capacitors are only charged to a percentage of their full capacity when one or more monitoring devices, or devices being monitored within the system, are either non-functional, or partially functional. As one example, if a temperature sensor within the device is malfunctioning, the system may only charge the capacitors within a bank to 90% of their fully rated charge potential. This could prevent the system from overheating because certain types of capacitors are more tolerant to high temperatures at lower voltage.

In another embodiment, the capacitors themselves may be non-functional or partially functional, also leading to a determination to operate the system in a degraded power state. In some embodiments, the capacitors will experience a lower failure rate at a reduced power state, due to other conditions, such as temperature. For this reason, the capacitor system may include one or more software, firmware, or hardware modules that are configured to detect and operate the capacitor system in a degraded state, wherein the capacitors are charged to a lower voltage than their maximum rated voltage in otherwise normal circumstances. For example, the system may be configured to detect a condition relevant to the capacitor-based charging system and take an action based upon that detection. In some embodiments, the action may be adjusting the target voltage to be used when charging one or more capacitors within the capacitor system.

The system may also provide feedback, or notification, to a user or driver regarding the condition that was detected and/or the action taken with respect to the condition. In some embodiments, the target voltage of one or more capacitors can be adjusted to a lower operational voltage that allows the capacitor system to operate at a degraded state while still providing at least partial functionality to another device. For example, the lower operational voltage may allow the capacitor system to provide at least sufficient power for a starter motor in a commercial truck to start an engine system. However, the amount of power provided to the starter motor during degraded state operation can be selected so that it notifies the driver of degraded state operation. For example, in a degraded state operation in response to a particular event, the capacitor system may be set to charge the capacitors to 90% of their normal target voltage. This amount of charge could still turn a truck starter motor, but more slowly than if the capacitor system was running in its full state. This slower turning of the starter motor, or a corresponding change to its "audible signature" would be detectable by the driver, who would therefore be notified that the capacitor system was operating in a degraded state.

In some embodiments, a request for additional action or input can be provided to respond to the feedback or notification to the driver. For example, a request for input or additional action may reset the systems described herein, to return the capacitor system from a degraded operational state to a normal operating state.

In yet another embodiment, the voltage of one or more capacitors can be controlled as a function of a detected temperature. For example, a controller can control a charging circuit to charge a capacitor system to a first target voltage when the capacitor is below a first, lower temperature, and to a second, lower target voltage when the capacitor is above a second, higher temperature, and a varying, approximately linear transition of voltage as a function of temperature between the lower and higher temperature. Such temperature control can improve performance of the capacitor system at various temperatures while improving capacitor life.

In some embodiments, the capacitor system may include a controller configured to interact with a capacitor system to provide the functionality described herein. Embodiments of the invention described herein can include any of a number of different software, hardware, firmware, electronic circuits, controllers, computers (including hand-held computing devices), microchips, integrated circuits, printed circuit boards, and/or other microelectronic component known or described herein, or combinations thereof, and methods related thereto, suitable to provide the functionality described herein. Additionally, the functionality described herein for managing a capacitor system can be provided through any suitable electronic, mechanical, pneumatic, hydraulic, and/or other components and/or systems, or combinations thereof, or methods related thereto.

The components and/or systems described herein for managing one or more capacitors in a capacitor system can be separately or integrally formed with the capacitor system. In some embodiments, the components and/or systems can be implemented with a plurality of capacitors that form a capacitor "bank." The capacitors within the capacitor bank can be connected in series, in parallel, or in any matrix combination of capacitors connected in series and in parallel. The specific quantity of capacitors or other components described in the systems herein is for illustrative purposes only. Additionally, although the embodiments of the systems and methods for managing a capacitor system are described herein in a vehicular context, such as a commercial truck, they are not limited to any particular type of vehicle or system.

Some embodiments of the system and apparatuses described herein can be configured to interact with and/or provide functionality to additional or alternative systems than a capacitor or commercial truck system. For example, the embodiments herein can be implemented with or within other systems that use an internal combustion engine, such as boats or cars. Embodiments of the systems and methods described herein can be implemented with or within a non-vehicular system that uses a capacitor system, such as a power generator for producing electricity. In some embodiments, the systems and apparatuses can be implemented in combination with an internal combustion engine system which may include an engine, an alternator, a battery system and/or a starter system. Some embodiments can be configured to be used as a drop-in replacement for one or more batteries in a vehicular battery system, such as a Battery Council International (BCI) Group 31 or other sized battery. For example, the system can fit within a space envelope of approximately 330 mm length, approximately 173 mm wide, and approximately 240 mm high (including the terminals). In some embodiments, the energy storage systems described herein can be configured to provide a capacitance between a range of approximately 200 farads to approximately 2500 farads, or more narrowly, between a range of approximately 300 farads to approximately 1000 farads, or more narrowly, between a range of approximately 500 to approximately 1000 farads. In some embodiments, the energy storage systems described herein can be configured to provide a capacitance of approximately 1000 farads. In some embodiments, the energy storage systems described herein can be configured to provide a capacitance up to 7000 farads, or even more, for example, when implemented within some military vehicles or other vehicles with large power specifications.

Some embodiments can be implemented with a capacitor system that can be connected to a portion of the starting system of a vehicle or truck, to provide energy and power to the starting system. For example, in some embodiments, the capacitor system can be connected to a portion of the starter, such as the starter solenoid. Some embodiments can connect a capacitor system to the starter of a vehicle, without connecting the starter or the capacitor system to the battery and/or primary power system within the vehicle. The systems and methods described herein can be implemented within power systems configured for different operational voltages, such as 6 volt systems, 12 volt systems, 24 volt systems, 36 volt systems, 48 volt systems, and other operating system voltages. In some embodiments, the systems and methods described herein can be implemented within systems with an operating voltage typical of a vehicle or internal combustion engine system.

FIG. 1 is a schematic block diagram illustrating an embodiment of an energy storage system 10 used in combination with, for illustrative purposes only, an internal combustion engine system 100. The energy storage system 10 can include a capacitor system 20 comprising one or more capacitors. In the illustrated embodiment, the capacitor system 20 comprises a capacitor bank 25 having a plurality of capacitors. The capacitor system 20 can be configured to power a starter 70, which is configured to crank and start an internal combustion engine 110. A control switch 23 can be positioned between the capacitor system 20 and the starter, to allow selective electrical communication between the capacitor system 20 and the starter. The engine system 100 can include an alternator 60 configured to charge a battery 50. The battery 50 can optionally be connected to the starter 70 through a control switch, to provide optional, selective power for starting the engine 110.

There may be some advantages to start engine 110 with the energy storage system 10, because the capacitor system 20 may perform better than comparable battery systems under some conditions. For example, capacitors may hold a charge better, have improved cycle life, provide a quicker charge and discharge time, and have more efficient charge acceptance than a comparable battery. Capacitors may also provide better starter performance at some temperatures, such as a cold-start application. For example, some embodiments of the energy storage system described herein can include a capacitor system with enough energy and power to cold start a 9.0 to 16.0 L diesel engine unassisted at approximately −18° C., or even at temperatures as low as −40° C. or lower.

The energy storage system 10 can include a charging circuit 30 configured to connect to a power source at a battery terminal 51 and provide a current output. The charging circuit 30 can be configured to receive power from the battery 50 and/or the alternator 60, and output a current to charge the capacitor system 20. The charging circuit 30 can be connected to the capacitor system 20 along a capacitor terminal 21, and can charge the capacitor system 20 to a target capacitor output voltage $V_c$. The charging circuit 30 can comprise a DC to DC converter, such as a Single Ended Primary Inductance Converter (SEPIC), a boost converter, a buck-boost converter, a current-limiting resistor, a diode, or any other suitable device for selectively charging a capacitor from a power source, as described herein or known in the art. Any of these charging circuits can be controllable so that the desired charging output voltage to the capacitor can be achieved.

In some embodiments, the charging circuit 30 can provide a constant current output. The charging circuit 30 can be configured to be activated and deactivated to allow and prevent the output current from flowing from charging circuit 30 into the capacitor system 20. The rate of charge from the charging circuit 30 into the capacitor system 20 can be controlled by controlling the rate of activation and deactivation of the output current. The control of charging circuit 30, and other functionality within energy storage system 10 can be provided by a controller 40. In some embodiments, energy storage system 10 can include a voltage sensor configured to detect the capacitor output voltage $V_c$ and provide voltage feedback to an operator, the controller 40, or another component or system. In some embodiments, the voltage feedback from the voltage sensor can allow for the user or controller to take an action, such as adjusting the target voltage.

In some embodiments, the capacitor system 20 can include a balancing circuit 90 configured to manage the voltage of individual capacitors within a capacitor bank relative to each other and the overall capacitor output voltage $V_c$. The balancing circuit 90 can "balance" or reduce the differences between the voltages of the individual capacitors. Such balancing can avoid certain capacitors being charged to a higher or lower voltage than other capacitors, which can have an impact on the service life of the capacitor system 20. In some embodiments, balancing circuit 90 can be configured to allow the overall capacitor output voltage $V_c$ to be reduced from a first target voltage to a second target voltage, as described further herein. The balancing circuit 90 can include a number of different configurations, using wires, printed circuit boards, and the like. An embodiment of the balancing circuit 90 is described in further detail below with reference to FIG. 3.

The controller 40 can be in communication with the charging circuit 30, the capacitor system 20, and other components and systems to provide additional functionality to energy storage device 10. For example, controller 40 can be configured to detect one or more conditions relevant to the capacitor system 20, determine whether the capacitor system 20 should be operated in a degraded state in response to the condition, and take an action based upon the condition detected. The action taken may be to cause the capacitor system to operate in a degraded state. Such operation in a degraded state may prevent a safety incident, and prevent damage to or a complete shutdown of the capacitor system, or other system within which it is implemented. In some embodiments, the controller 40 can provide a notification regarding the condition that was detected and/or the action that was taken with respect to the condition. Controller 40 can also be configured to detect one or more conditions, determine whether to operate in a degraded state based upon the condition, take an action based upon the condition detected (such as causing a degraded state operation), and/or provide a notification for other systems than capacitor system 20. For example, such controller 40 can be configured to provide such functionality related to other power source systems such as battery 50 and alternator 60 and other systems.

The controller 40 can detect a condition within the systems described herein using any of a variety of sensing devices and methods. Such sensing devices and methods can be configured to detect a condition relevant to the capacitor system 20. The sensing devices can be positioned within, on, proximate to, or even external to, capacitor system 20, and still detect a condition relevant to capacitor system 20. For example, sensing devices can be configured to detect the output voltage $V_c$, the temperature of and pressure within the capacitors of system 20, or conditions within the balancing circuit 90. In some embodiments, sensing devices can be configured to detect a condition that is external to, but may still impact the performance of, capacitor system 20, such as the battery voltage $V_b$, and the condition of the charging circuit 30.

In some embodiments, the capacitor system 20 can include one or more sensors 80 configured to detect a condition relevant to the capacitor system 20 and provide an input to the controller 40. The sensors 80 can be positioned within, on, proximate to, or external to the capacitor system 20. Sensors 80 can include any of a number of different monitoring devices or systems suitable to detect any of a number of different conditions, and communicate the condition to the controller 40. For example, sensors 80 can comprise voltage sensors, capacitance sensors, current sensors, temperature sensors, pressure sensors, and/or other sensors to detect other conditions.

The input to controller 40 of a condition detected by one or more of sensors 80 can be evaluated by controller 40 to determine whether the condition is related to the capacitor system, and/or whether the capacitor system should operate in a degraded state in response to the condition. Such evaluation can be based upon a comparison of the condition to a programmed setpoint or previously detected condition, such as a difference between the condition and the setpoint, or a more complex algorithm. Any of a number of different detected conditions may be used to determine whether the capacitor system should be operated in a degraded state, and any of a number of actions can be taken in response.

Figure 2:
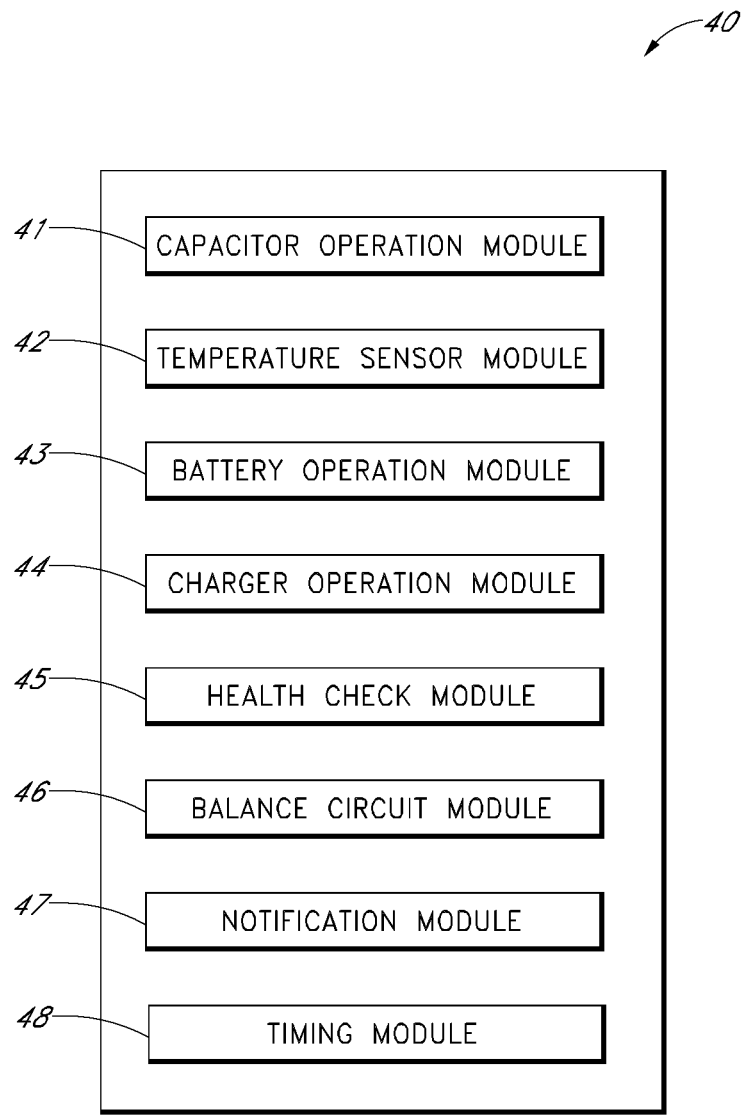
FIG. 2 is a system block diagram illustrating an embodiment of a controller.

FIG. 2 is a system block diagram illustrating an embodiment of the controller 40. The controller 40 includes a series of modules programmed to provide different functionality to the energy storage system 10, or its related systems. For example, the controller 40 can include one or more, or any combination of, a capacitor operation module 41, a temperature sensor module 42, a battery operation module 43, a charger operation module 44, a health check module 45, a balance circuit module 46, a notification module 47, and a timing module 48. One or more of these modules may be configured to detect a condition and determine whether energy storage system 10 or its related systems should be operated in a degraded state in response to the condition. One or more of these modules may be configured to take an action based upon the condition, such as causing energy storage system 10 or its related systems to operate in a degraded state. In some embodiments, the modules may provide a notification regarding the condition and/or the action taken.

The modules described herein with respect to controller 40 are used for convenience to illustrate functionality that can be provided by controller 40, and can be separate or integrated with respect to each other using various software, firmware, or hardware, to provide such functionality. As can be appreciated by one of ordinary skill in the art, each of the modules can comprise various sub-routines, procedures, definitional statements and macros. Each of these can typically be separately compiled and linked into a single executable program. Thus, the processes that are undergone by each of the modules may be arbitrarily redistributed to one of the other modules, and/or combined together in a single module.

Referring to FIGS. 1 and 2, the capacitor operation module 41 can be configured to monitor and control the target output voltage of capacitor system 20, and/or the voltage of one or more capacitors within the capacitor system 20. For example, the capacitor operation module 41 can detect the overall output voltage $V_c$ of the capacitor system 20 and/or can detect an output voltage across one or more individual capacitors within capacitor system 20. In some embodiments, sensors 80 can include voltage sensors configured to detect the output voltage $V_c$ at terminal 21. In some embodiments, sensors 80 can include voltage sensors configured to detect the voltage across one or more capacitors within capacitor system 20, as described further below with reference to FIG. 3. The voltage detected may reflect an over or under voltage condition in one or more individual capacitors or in the overall output voltage $V_c$ of the capacitor system 20. The over or under voltage condition can be based upon a deviation of the detected output voltage $V_c$ from a first target voltage. A condition in capacitor system 20 can be caused by a number of different conditions, such as a broken, missing or otherwise reduced-performance wire, connection or contact, as described further herein. In response to one or more of these detected voltage conditions, the capacitor operation module 41 may cause capacitor system 20 to operate at a degraded state, such as a target, reduced voltage.

Some embodiments of capacitor system 20 may be configured to operate at a degraded state by disabling charging to one or more of its capacitors, or to its entire capacitor bank 25, in response to a detected voltage condition. For example, overvoltage protection can be provided in a first stage by configuring capacitor operation module 41 to turn off an enable signal to the charging circuit 30 if a threshold target voltage of capacitor system 20 or one of its capacitors is reached. In some embodiments, capacitor operation module 41 can provide a second stage of overvoltage protection by providing an end of charge voltage defined by a pulse width modulator (PWM) to voltage converter that sets a shutdown voltage at the output of charging circuit 30. The shutdown voltage setpoint can be provided as a PWM signal by the controller 40. By using an RC filter, the PWM signal can be converted into a voltage signal. The voltage signal can be added to an offset to create a minimum charge voltage, for example, of 15V (referring to a six cell capacitor system), if the communication to the microcontroller system is ever lost. A third stage overvoltage protection can include a maximum threshold voltage, wherein if the voltage in the energy storage system exceeds the threshold voltage, the charging circuit 30 is disabled by creating an overvoltage protection signal inside the power stage of the DC-DC converter that shuts down the charging circuit 30. The disablement of the charging circuit 30 and its ability to charge capacitor system 20 may prevent an over-voltage condition to one or more of the capacitors or the entire bank 25. However, complete disablement of charging circuit 30 or capacitor system 20 may prevent a vehicle or other system for which the capacitor system 20 provides power from starting.

In response to detection of a condition related to capacitor system 20, the capacitor operation module 41 can be configured to adjust the capacitor system 20 from the first target voltage to a second target voltage that is less than the first target voltage. The second target voltage can be adjusted to a value that, while causing the capacitor system 20 to operate in a degraded state, can nonetheless allow the capacitor system 20 to retain sufficient charge to provide some functionality. For example, referring to FIG. 1, the second target voltage can be adjusted to a value that provides a sufficient charge in the capacitor system 20 to activate starter 70, and start the internal combustion engine 110.

By reducing the output voltage $V_c$ of the capacitor system 20 from the first target voltage to the second target voltage, the risk of overvoltage of one or more capacitors in the bank is reduced, while allowing the capacitor system to still provide a charge and operate at a reduced performance. For example, a capacitor system that normally may operate at 15.0-16.2 V may be charged to a second target voltage of only approximately 12V; a capacitor system that normally may operate at 25.0-27.0V may be charged to only approximately 20V. In some embodiments, a capacitor system of any operating voltage may be charged to approximately 50%, 60%, 70%, 80%, 90% or more of its normal operating voltage, although embodiments are anticipated that provide a reduced operating voltage of any amount less than 100%. In some embodiments, a capacitor system can be charged to a second target voltage that can still provide the ability to crank an engine for two back-to-back cranks for approximately 2 seconds per crank at approximately −18° C.

The controller 40 can adjust the capacitor output voltage $V_c$ of the capacitor system 20 from the first target voltage to the lower second target voltage in a number of different ways. For example, if the charge of capacitor system 20 is depleted while the energy storage system 10 is at rest, deactivated, or losing charge from a short or other failure mode, the capacitor system 20 may drop to a point below both the first target voltage and the second target voltage. Under such an embodiment, the capacitor module 41 or the charger operation module 44 can charge the capacitor system 20 to the reduced second target voltage upon initially starting the engine 110 (and alternator 60), and/or upon activating the charging circuit 30.

In some embodiments, the output voltage $V_c$ of capacitor system 20 can be adjusted through electronic features that are configured to divert power from the capacitor system 20 to other system loads. These electronic features can be included as a part of energy storage system 10, such as within the capacitor system 20, or as part of another system. For example, the operating voltage $V_c$ of the capacitor system 20 may be reduced by diverting power from the capacitors to power another vehicle load, such as vehicle headlamps or an operating light. Such a load on the capacitor system 20 can subsequently be removed after the output voltage $V_c$ drops from the first target voltage to the second reduced target voltage.

Figure 3:
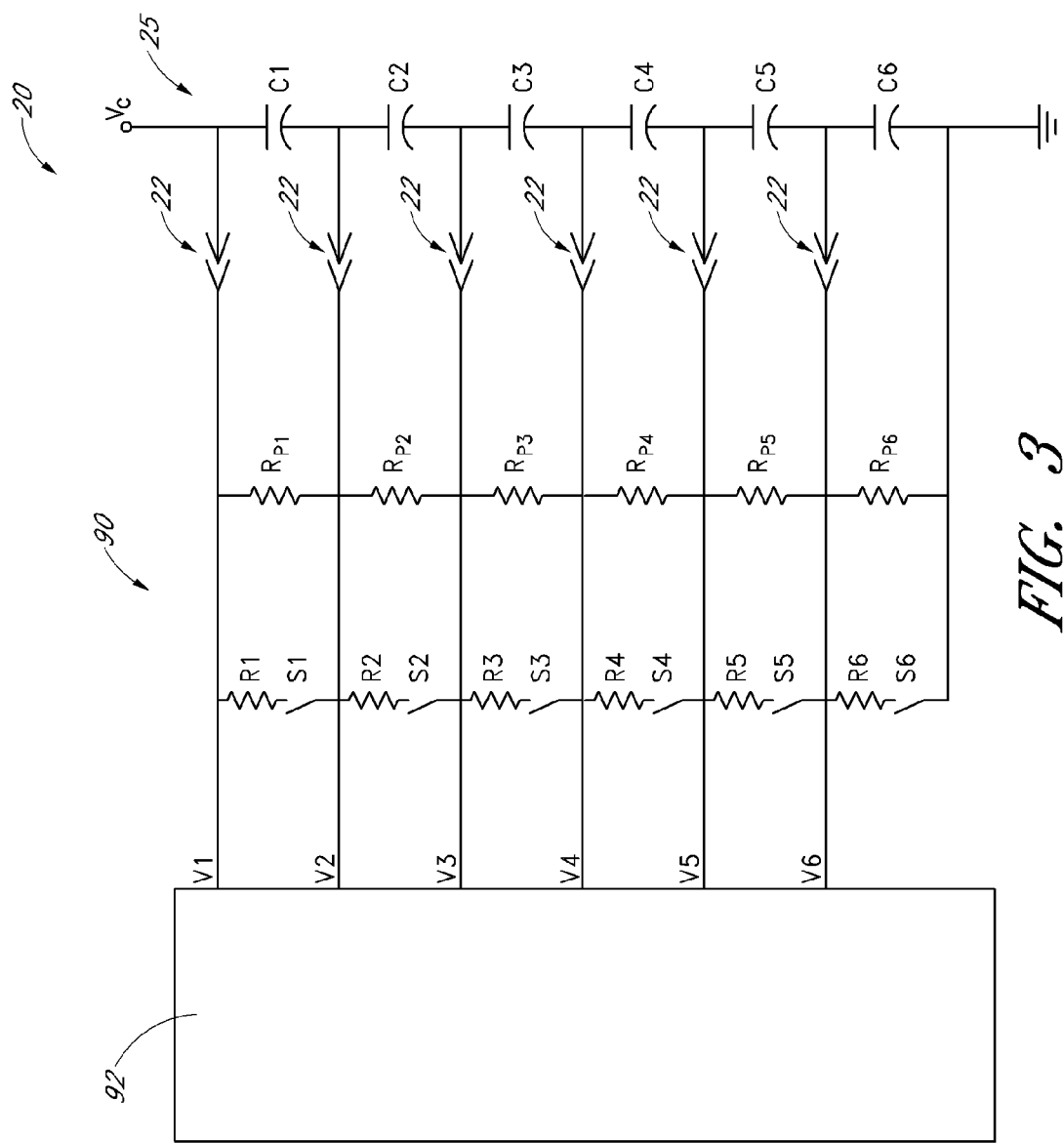
FIG. 3 is a schematic diagram illustrating an embodiment of a balancing circuit for a bank of capacitors.

In some embodiments, the output voltage $V_c$ of capacitor system 20 can be adjusted through a system or circuit configured to balance the individual voltages across one or more capacitors within the capacitor system 20. The balancing circuit 90 can provide such functionality, an embodiment of which is shown in FIG. 3 and described further below.

Referring again to FIGS. 1 and 2, in some embodiments, the capacitor operation module 41 can detect a degraded capacitance of one or more capacitors in the capacitor system 20. The degraded capacitance can be detected using a capacitance sensor or other suitable system or device. In response, the one or more degraded capacitors can be charged by the capacitor operation module 41 or charger operation module 44 to a higher voltage, to compensate for the reduced capacitance. The higher voltage may be selected to be greater than a typical operating voltage under similar operating conditions, such as temperature. Under such a degraded operational condition, the higher voltage may increase wear on the capacitor, or cause capacitor failure. Thus, the timing for which the capacitor operation module 41 provides such increased capacitor voltage can be controlled through a timing module 48. For example, the timing module 48 may be configured to prevent operation of the capacitors at an increased voltage for extended periods, to prevent some amount of wear or complete failure of the capacitors. The timing module 48 may allow the degraded capacitors to be operated at an increased voltage for a period sufficient to provide notification that the capacitor system is operating in a degraded state through the notification module 47, providing the opportunity for corrective action.

Continuing to refer to FIG. 2, in some embodiments, the temperature sensor module 42 can be configured to detect a temperature of the capacitor system 20 or other systems. In one embodiment, the temperature can be detected directly on one or more capacitors. In another embodiment, the temperature can be detected indirectly by sensing near, but not in contact with, one or more capacitors. The temperature sensor module 42 can include or receive input from a contact sensor or a non-contact sensor. One example of a contact sensor is a thermocouple or thermistor type sensor. One type of non-contact sensor is a pyrometer. Of course other suitable temperature-sensing devices, or combinations thereof are contemplated within the scope of this invention.

In response to detection of a temperature, the output voltage of the capacitor system 20, or the voltage across its individual capacitors, can be adjusted as a function of temperature. For example, one or more capacitors in the capacitor system can be charged to a voltage that corresponds to a targeted voltage, wherein the targeted voltage varies with a given capacitor temperature. The capacitor or capacitor system voltages can be detected using voltage sensors as described elsewhere herein, which can provide feedback to temperature sensor module 42. In some embodiment, temperature sensor module 42 can control the capacitor or capacitor system voltage as a function of the detected temperature.

Such temperature control of capacitor voltage can be beneficial for any of a number of reasons. For example, the lifetime of a capacitor is inversely proportional to the temperature and voltage at which the device is operated. Increased temperatures and/or voltages can shorten the lifetime of the device, whereas decreased temperatures and/or voltages can lengthen the lifetime of the device. Additionally, the task of providing power to another system to which a capacitor system is connected can be more difficult at low temperatures. Thus, it can be beneficial to increase the amount of power and energy supplied to the system at lower temperatures. Thus, controlling voltage in a capacitor system with respect to a temperature can improve performance of the capacitor system at various temperatures while improving capacitor life.

In some embodiments, the temperature sensor module 42 can detect an overtemperature condition of one or more capacitors within capacitor system 20, of the charging circuit 30, or other systems. In response to this condition, the controller 40 can be configured to take various actions. In some embodiments, the controller 40 can cause the charging system 30 to operate in a degraded state, by disabling or otherwise limiting the charging system 30, and/or reducing the rate of charge to the capacitor(s) or capacitor system. Such disablement can reduce effects of the overtemperature condition on the capacitor system 20 or charging circuit 30. In some embodiments, the voltage $V_c$ to the capacitor system 20, and/or the voltage $V_n$ across the individual capacitors within the capacitor system 20 (FIG. 3) can be adjusted in response to a detected overtemperature condition. In some embodiments, the temperature sensor module 42 can be configured to restart the charger upon the temperature reaching a value below a given overtemperature limit.

In some embodiments, the temperature sensor module 42 can detect an undertemperature condition of one or more capacitors within capacitor system 20. For instance, certain types of capacitors may become inoperative below some temperatures, such as below approximately −40° C., although the capacitor energy storage device or the system in which it is implemented may operate at those lower temperatures. In response to this condition, the controller 40 can be configured to take various actions. For example, a heating device or feature within or proximate to the capacitor system 20 can be activated, to increase the temperature during the degraded state of operation. For example, energy can be transferred from another source, such as the system battery, to a heater that raises the temperature of the capacitors to the point where they can function properly.

In some embodiments, failed temperature sensors can be detected. In response to this condition, the capacitor system 20 can be controlled by controller 40 to operate as though it were at an increased temperature than normal operating conditions. In some embodiments, the capacitor system 20 can be controlled to operate as though it is at its highest operating temperature. Such embodiments of degraded state operation of the capacitor system 20 can prevent increased wear or failure of the capacitor system 20, should it actually be operating at those temperatures without such feedback from the temperature sensors.

Figure 6:
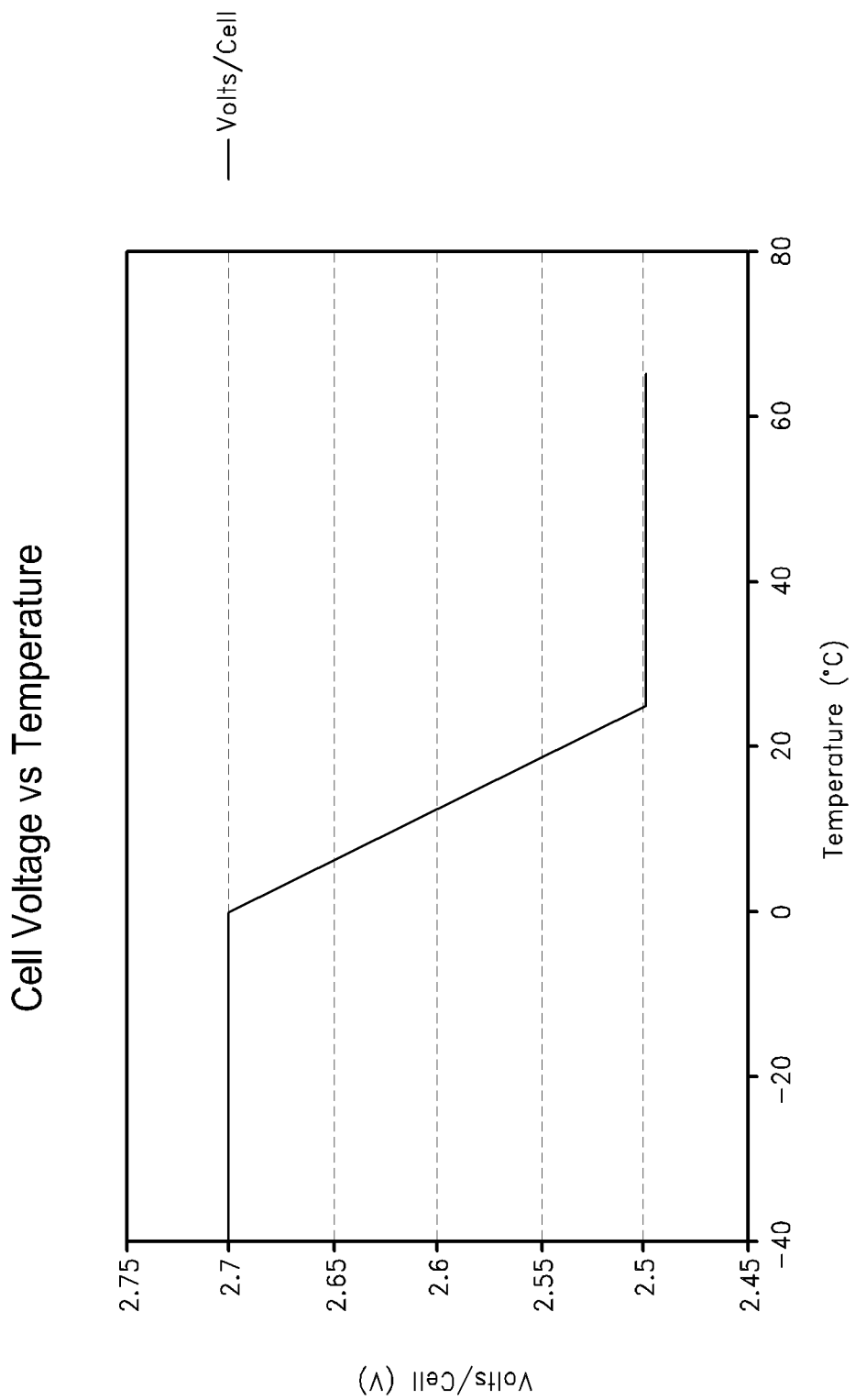
FIG. 6 is a graph illustrating capacitor voltage as a function of temperature, according to an embodiment.

As such, controller 40 can form an open or closed loop control system implemented with voltage sensors and/or temperature sensors, to control the temperature/voltage relationship in the one or more capacitors. The voltage across the capacitors or of the capacitor system 20 can be adjusted using any of the systems and methods described herein or known in the art. FIG. 6 illustrates a graph showing a capacitor voltage controlled within a capacitor system as a function of temperature, according to an embodiment, as described further below.

The battery operation module 43 can be configured to detect and respond to a condition relative to the battery 50, such as a high or low battery voltage $V_b$ of battery 50 (FIG. 1). A low battery voltage may be caused, for example, by an increased demand on battery 50, a failed or reduced performance charging system to battery 50, or from reduced battery performance when the battery 50 approaches the end of its life cycle. In response, the battery operation module 43 can cause the capacitor system 20 to operate in a degraded state, by disabling the charging circuit 30 to the capacitor system 20, or by providing a reduced rate of charge to the capacitor system 29, to prevent further drain on the battery voltage.

A high battery voltage can be caused, for example, by a phenomenon known as "load dump" where the connection between the battery and the alternator is interrupted. Another cause can be a failure of the alternator itself, or another external voltage source, that causes the output voltage to exceed an upper voltage of its normal voltage range. In response, the controller can disable the charger to the capacitor system. This disablement can prevent possible damage to the electronic components within the charger and/or the controller. A notification can be provided in response to the aforementioned operation of the capacitor system at a degraded state, due to an over or under voltage to the battery.

The charger operation module 44 can be configured to detect an inoperative or degraded charging circuit 30 to the capacitor system 20. In response to this condition, the charger operation module 44 can take any of a number of actions to cause capacitor system 20 to operate at a degraded state. In some embodiments, the charging operation module 44 can disable charging of the capacitor system 20 by the charging circuit 30. In some embodiments, the charger operation module 44 can provide power to the capacitor system 20 from an alternative power source. For example, the battery 50, or a second, backup power or charging system, can be rerouted and switched to provide backup switched power to the capacitor system 20 instead of the charging circuit 30. In some embodiments, the charger operation module 44 can be configured to disable operation of the capacitor system 20 and an alternative system can be engaged to provide power instead of the capacitor system 20. For example, the charger operation module 44 can deactivate or decouple the capacitor system 20 from the starter 70, and instead couple the battery 50 to the starter 70, such that the battery 50 is used to start engine 110.

The health check module 45 can be configured to perform an internal health check to verify the integrity of one or more features or components of the capacitor system 20. For example, a test of the working integrity of the controls, electronics, mechanical or other components can be performed to verify proper operation of one or more of these components. Such a test can be performed continuously, or intermittently, for example, with a timer through the timing module 48, or programmed to activate in response to a setpoint or other memory check. Such a test can be performed to detect one or more events or conditions that might trigger operating the capacitor system 20 in a degraded state, and/or to determine whether a degraded state operation has or will occur, with respect to operation of one or more components of the capacitor system 20. In response, the capacitor system 20 can be reset or rebooted, for example, with a power down and restart. During such reset, the charging circuit 30 to the capacitor system 20 can be disabled, and/or the power into the capacitor system 20 can be rerouted or switched, such that the battery 50 provides power to the capacitor system 20 instead of the charging system 30. Various levels of redundancy can be included to ensure that the engine can still be started even in the case of multiple component failures. For example, in some embodiments, during the reboot, the battery can provide alternative power to the charging system and/or the starter.

The health check module 45 can include a test button to verify operation of or provide feedback with respect to one or more characteristics of the capacitor system and/or balancing and control system. In some embodiments, the test button can become stuck in an "on" or "off" position. Such a condition can be detected, either manually or through detection devices known or described herein. In response, the indication device(s) (e.g., LED indicators) associated with the test button can be disabled.

The notification that a system is operating in a degraded state described herein can be provided in any of a number of different ways. In some embodiments, the notification module 47 can provide feedback through an indicator light, alarm, user manual, or other feedback device or user interface, allowing the operator to take action. For example, an indicator or feedback device may be implemented as part of the system in which the capacitor system is implemented (such as in the cab of a truck). In some embodiments, an indicator device, such as an L.E.D., can be mounted on the capacitor system, indicating that a failure has occurred and the system should be reset, repaired or replaced. The notification can be provided through a wired network interface (e.g., CAN, RS232, LIN, etc.), a wireless network interface (e.g., Bluetooth, WiFi, Zigbee, etc.), a discrete output (e.g., a gauge or "indicator light"), or combinations thereof.

In some embodiments, the reduced system performance during degraded state operation can provide the notification to an operator of the system, with or without an additional notification, such as an indicator light. For example, selecting and adjusting the capacitor system 20 to the reduced second target voltage, may cause a detectible reduced performance of the system, such as a slower or less audible operation of the starter 70, or a longer time period for the starter to start an engine. Such a detectible reduced performance can provide notification to an operator of the system that the capacitor system is operating in a degraded state. It will be understood that a notification step or device can be implemented in the systems described herein for any of the detection steps or devices, even if not explicitly described.

FIG. 3 is a schematic diagram illustrating an embodiment of the balancing circuit 90 implemented with the capacitor bank 25. The capacitor bank 25 is shown with a plurality of six capacitors (C1-C6) for illustrative purposes only. The balancing circuit 90 can be configured to balance the overall capacitor system voltage, $V_c$. In some embodiments, the overall output voltage $V_c$ can be adjusted by adjusting the voltage $V_n$ over one or more of the capacitors $C_n$. In some embodiments, the voltages of individual cells can be balanced to a target voltage that corresponds to $V_c/N$, where N is the number of capacitors in the capacitor bank. The balancing circuit 90 can balance the capacitor system 20 by reducing the differences between the voltages $V_n$ over each capacitor $C_n$. Some balancing can avoid certain capacitors being charged to a higher or lower voltage than other capacitors, which can have an impact on the service life of the capacitor system 20.

The balancing circuit 90 can include a voltage monitor integrated circuit (IC) 92 to control the balancing of the capacitor voltages within the balancing circuit 90. The voltage monitor IC 92 can be part of the controller 40 (such as part of the balance circuit module 46), or can be a separate feature in communication with controller 40. Other components that provide similar functionality can be used instead of the integrated circuit of the voltage monitor IC 92. The voltage monitor IC 92 can be configured to allow one or more devices in the capacitor system 20 to be operated at a degraded state, for example, by adjusting the voltage of the capacitors C1-C6, in response to some voltage conditions that are detected.

Continuing to refer to FIG. 3, the voltage monitor IC 92 can monitor the voltage $V_n$, across each of capacitors C1-C6. In response to a detected voltage $V_n$ across one or more capacitor cells ($C_n$), the balancing circuit 90 can operate one or more switches $S_n$ between an open and closed state. For example, switches $S_n$ can be closed if the voltage $V_n$ across one or more capacitor cells ($C_n$) exceeds a value. In this way, energy can be dissipated by the respective resistor $R_n$, decreasing the voltage $V_n$ over the corresponding capacitor cell(s). In some embodiments, switches $S_n$ can be opened if the voltage $V_n$ across one or more capacitor cells ($C_n$) drops below a value, which in turn will prevent that particular capacitor cell from discharging further. It will be understood that switches $S_n$ are shown for illustrative purposes, and any of a number of different components or systems that provide similar functionality are contemplated. In some embodiments, switches $S_n$ include a transistor.

In some embodiments, additional resistors $R_{Pn}$ can be provided. The resistance of $R_{Pn}$ can be significantly greater than the resistance of $R_n$. In such embodiments, when the system is operating normally, and a switch $S_n$ is closed, the corresponding voltage $V_n$ over a capacitor cell $C_n$ will not vary significantly. However, if a connection to the capacitor $C_n$ is broken or degraded, the voltage $V_n$-$V_{n+1}$ will be reduced, because of the difference in resistance between $R_{Pn}$ and $R_n$. Examples of such broken or degraded connections 22 are shown schematically in FIG. 3. The reduced voltage $V_n$-$V_{n+1}$ and difference in resistance between $R_{Pn}$ and $R_n$ can allow the broken or degraded connections 22 to be detected by the voltage monitor IC 92. In response to such a condition, the balancing circuit 90 can cause a degraded operational state by controlling switches $S_n$ to adjust the voltage $V_c$ of the capacitor bank from a first target voltage to a second, lower target voltage. These embodiments can allow a capacitor system to continue to safely operate at a lower performance, preventing complete disablement of a larger system in which the capacitor system is implemented.

The balance circuit module 46 can be configured to detect a failed switch $S_n$ in the balance circuit 90, indicating another detected condition of the capacitor system 20. For example, the switch $S_n$ can fail closed, or can fail opened. Improper operation of the switch can be detected by monitoring the voltage of the node between the switch $S_n$ and the balancing resistor $R_n$. In response to detection of this condition, the capacitor system 20 can continue to be charged to a normal voltage, or can be charged to a second, lower target voltage, using the capacitor operation module 41 and/or charger operation module 44, similar to the degraded operational state described above.

It will be understood that the steps described herein of detecting a condition, taking an action in response to the condition, and/or providing a notification of the condition(s) can be used individually, or in combination with each other. For example, a condition can be detected without taking action in response to the condition. A condition can be detected, and notification can be provided, even if not explicitly stated in some of the embodiments herein, and a condition can be detected without providing notification. The actions described herein can be taken, with or without operator input, and can be taken automatically, or manually, in response to the detection of a condition. In some embodiments, a condition can be detected, and an operator can be notified, and given a choice between two or more actions, including the choice of whether to operate in status quo without action (e.g., monitor), or to activate or confirm an action in response to the condition detection and notification. Additionally, a timing element can be implemented with timing module 48 to delay any of the detection of a condition, response to the condition, and/or notification, even if not explicitly described herein.

Figure 4:
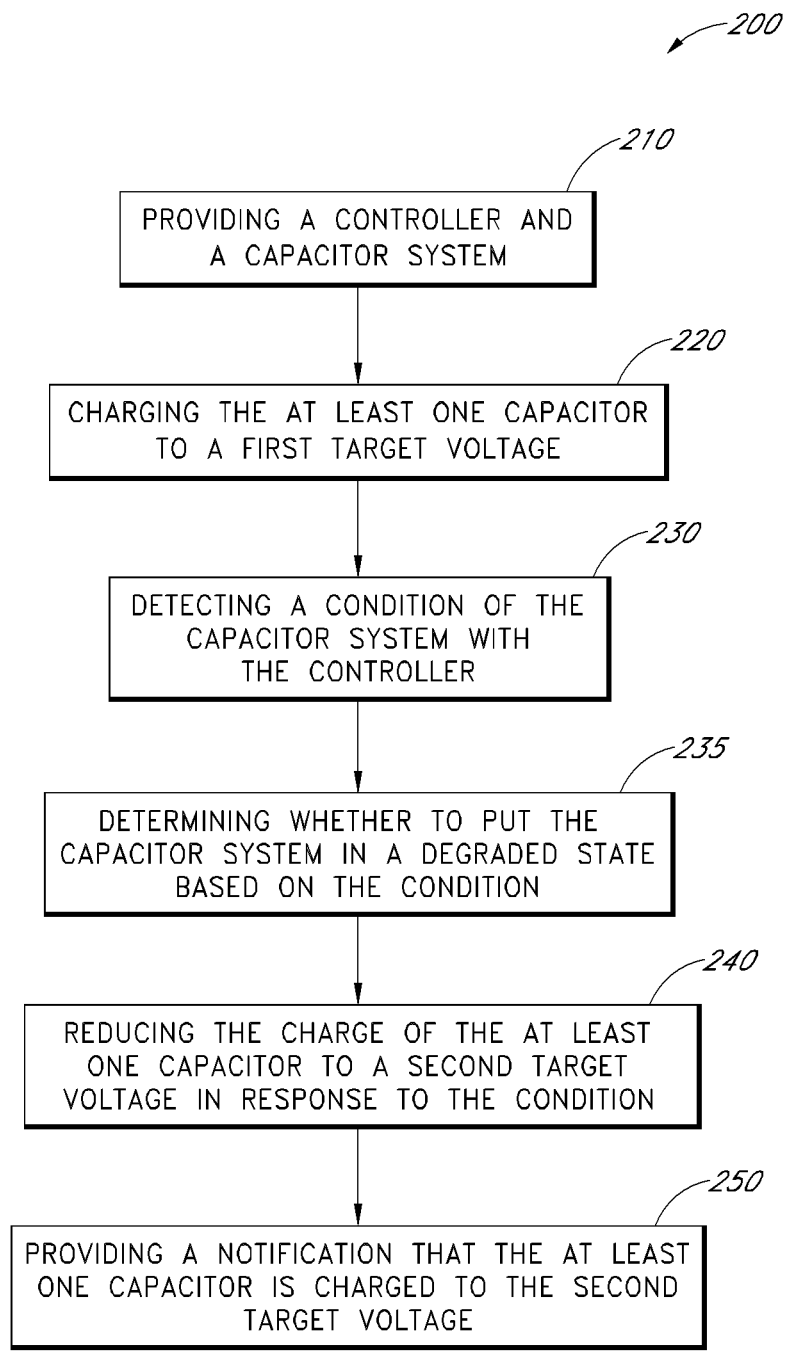
FIG. 4 is a flow diagram illustrating a method of operating an energy storage system, according to an embodiment.

FIG. 4 is a flow diagram illustrating a method 200 of operating a capacitor-based energy storage system, according to an embodiment. Method 200 can be implemented by the energy storage system 10 illustrated in FIG. 1. In some embodiments, the method 200 can be implemented using the controller 40 illustrated in FIG. 2. The method 200 begins by providing a controller and a capacitor system comprising at least one capacitor at block 210. The process 200 then moves to block 220 wherein the at least one capacitor, or capacitor bank, is charged with a charging circuit to a first target voltage. The method then moves to a block 230 wherein the system detects a condition reflecting a degraded state of the capacitor system. After the degraded state is detected, the process 200 moves to a block 235 wherein it is determined whether to put the capacitor system in a degraded state based on the condition. The process 200 then moves to block 240 wherein the target voltage is reduced to a second target voltage in response to the condition. The process 200 then moves to a state 250 wherein a notification can be made that the at least one capacitor is charged to the second target voltage.

Figure 5:
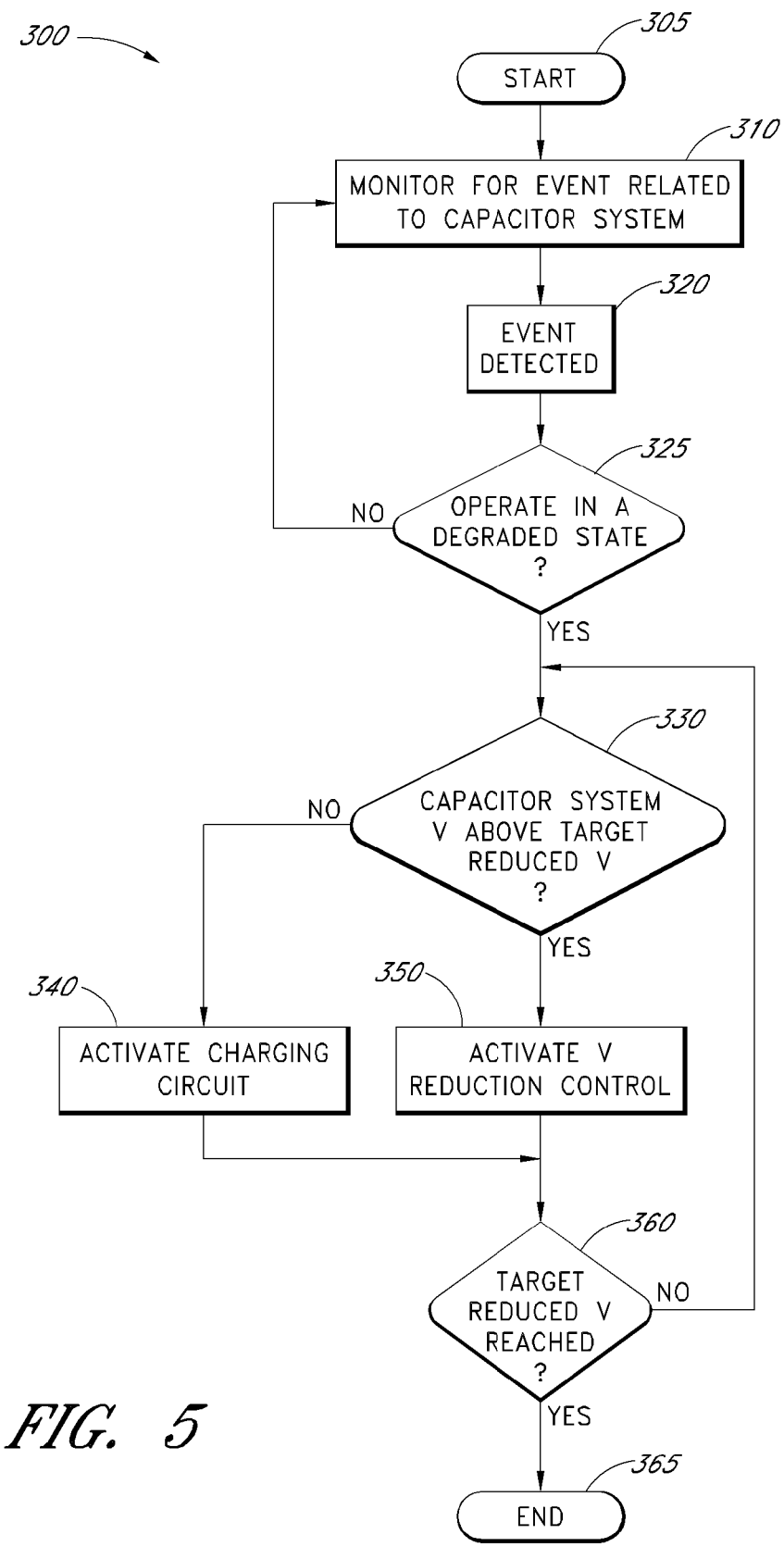
FIG. 5 is a flow diagram illustrating a method of operating an energy storage system, according to an embodiment.

FIG. 5 is a flow diagram illustrating a method 300 of operating an energy storage system, according to an embodiment. Method 300 can be implemented by the energy storage system 10 illustrated in FIG. 1. In some embodiments, the method 300 can be implemented using the controller 40 illustrated in FIG. 2. The method 300 begins at start block 305 and then moves to processing block 310, where an event related to a capacitor system is monitored. Method 300 then moves to processing block 320, where an event is detected. Method 300 than moves to decision block 325, where it is determined whether or not to operate in a degraded state in response to the detected event. If a decision is made not to operate in a degraded state based upon the detected event, method 300 returns to processing block 310, and processing block 310 repeats.

If a decision is made to operate in a degraded state, method 300 moves to decision block 330, where it is determined whether a detected capacitor system output voltage is above a target capacitor system degraded state voltage. If the detected capacitor system output voltage is below the target capacitor system voltage, method 300 moves to process block 340, where a charging circuit is activated to charge the capacitor system to the target capacitor voltage. If the detected capacitor system output voltage is above the target capacitor system voltage, method 300 moves to process block 350, where a voltage reduction control is activated to lower the capacitor system output voltage to the target capacitor system voltage. Method 300 moves to decision block 360, where it is determined whether the target voltage has been reached. If the voltage has not been reached, method 300 returns to processing block 300. If the voltage has been reached, method 300 moves to end block 365 and terminates.

Capacitor Voltage Control as a Function of Temperature

FIG. 6 is a graph illustrating capacitor voltage (Volts/Cell) as a function of temperature in degree Celsius, according to an embodiment of an energy storage system. The capacitor cell voltage as a function of temperature shown in FIG. 6 can be controlled using one or more of the embodiments of the capacitor system 20, balancing circuit 30, and/or controller 40, or other components or systems described herein. In the illustrated embodiment, an energy storage system having a set of capacitors can be controlled such that each capacitor cell is charged to 2.7V/cell at a temperature below 0° C., and to 2.5V/cell at a temperature above 25° C., with a linear relationship provided between 0° C. and 25° C. The actual values for capacitor cell voltage as a function of the temperatures shown in FIG. 6 are for illustrative purposes only. A similar function can be provided for various capacitances and temperatures, either of a capacitor system, and one or more individual capacitor cells within a capacitor system. For example, the voltages of the individual cells shown can be similarly controlled to a voltage that corresponds to $V_c/N$, where N is the number of capacitors in the capacitor bank, as a similar function of temperature. The relationships between capacitor cell voltage and temperature shown in FIG. 6 can be similarly applied towards controlling the overall output voltage of a capacitor system $V_c$. The relationships between capacitor cell voltage and temperature shown in FIG. 6 can be similarly applied towards controlling the output voltage of any one or more capacitor within a capacitor system, such as voltages V1-V6 described herein with reference to FIG. 3.

FIG. 6 shows an approximately constant cell voltage of a first value (approximately 2.7V) corresponding to a temperature less than or equal to approximately 0° Celsius, and an approximately constant reduced cell voltage of a second value (approximately 2.5V) corresponding to a temperature greater than or equal to approximately 25° Celsius with a transition between the two voltage values (at temperatures between 0° Celsius and 25° Celsius). Although the transition between these two voltage values is shown as being approximately linear, and the voltages below 0° Celsius and 25° Celsius are shown as being approximately constant, other embodiments are contemplated. For example, the relationship between the temperature and the capacitor cell or system output voltage over a range of temperatures and voltages, using a stepped, linear, logarithmic, parabolic, or other scale, under the general notion that at lower temperatures, a higher voltage is applied, and at higher temperatures, a lower voltage is applied. Moreover, in some embodiments, the capacitor cell or system output can be controlled to three or more approximately constant voltage values based upon other ranges of temperatures.

Those having skill in the art will further appreciate that the various illustrative logical blocks, modules, circuits, and process steps described in connection with the implementations disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention. One skilled in the art will recognize that a portion, or a part, may comprise something less than, or equal to, a whole.

The various illustrative logical blocks, modules, and circuits described in connection with the implementations disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or process described in connection with the implementations disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of non-transitory storage medium known in the art. An exemplary computer-readable storage medium is coupled to the processor such the processor can read information from, and write information to, the computer-readable storage medium. In the alternative, the storage medium may be integral to the processor. The processor and the storage medium may reside in an ASIC. The ASIC may reside in a user terminal, or other device. In the alternative, the processor and the storage medium may reside as discrete components in a user terminal, or other device.

The invention disclosed herein may be implemented as a method, apparatus or article of manufacture using standard programming or engineering techniques to produce software, firmware, hardware, or any combination thereof. The term "article of manufacture" as used herein refers to code or logic implemented in hardware or computer readable media such as optical storage devices, and volatile or non-volatile memory devices. Such hardware may include, but is not limited to, field programmable gate arrays (FPGAs), application-specific integrated circuits (ASICs), complex programmable logic devices (CPLDs), programmable logic arrays (PLAs), microprocessors, or other similar processing devices.

The previous description of the disclosed implementations is provided to enable any person skilled in the art to make or use the present invention. Various modifications to these implementations will be readily apparent to those skilled in the art, and the generic principles defined herein may be applied to other implementations without departing from the spirit or scope of the invention. Thus, the present invention is not intended to be limited to the implementations shown herein but is to be accorded the widest scope consistent with the principles and novel features disclosed herein.

While the above description has pointed out novel features of the invention as applied to various embodiments, the skilled person will understand that various omissions, substitutions, and changes in the form and details of the device or process illustrated may be made without departing from the scope of the invention.

It will also be understood that although many of the embodiments herein describe the use of various components in combination to form embodiments of a system and method for managing operation of a capacitor system in a degraded state, many of the components can be manufactured and provided independently without other components. For example, embodiments of the system and method for managing operation of a capacitor system in a degraded state, and any of the many other components described herein, or any combination thereof, can be provided separately, and/or as a kit. Thus, the invention is not to be limited otherwise.

What is claimed is:

1. An energy storage system, comprising:
   a capacitor system comprising one or more capacitors;
   a charging circuit configured to charge the capacitor system to a first target voltage; and
   a controller configured to detect a first condition and programmed, in response to the first condition, to instruct the charging circuit to charge the capacitor system to a second target voltage that is less than the first target voltage, and to provide a notification that the capacitor system is operating in a degraded state,
   wherein the controller is configured to select the value of the second target voltage based upon a type of the first condition.

2. The energy storage system of claim 1, wherein the capacitor system comprises a capacitance between a range of approximately 200 farads to approximately 2500 farads.

3. The energy storage system of claim 1, wherein the type of the first condition is at least one of a broken and shorted wire within the capacitor system.

4. The energy storage system of claim 1, wherein the capacitor system comprises at least one sensor configured to detect the first condition, the sensor configured to communicate the first condition to the controller.

5. The energy storage system of claim 4, wherein the sensor is positioned on a capacitor to detect a temperature condition of the capacitor.

6. The energy storage system of claim 1, wherein the capacitor system comprises a capacitor bank comprising a plurality of capacitors.

7. The energy storage system of claim 6, further comprising a balancing circuit configured to balance a plurality of capacitor output voltages with respect to each other, each capacitor output voltage extending across each of the plurality of capacitors.

8. The energy storage system of claim 6, wherein the first target voltage is defined as the overall voltage across the capacitor bank.

9. The energy storage system of claim 1, wherein the charging circuit is configured to output a constant current.

10. The energy storage system of claim 1, wherein the charging circuit comprises a DC to DC converter.

11. The energy storage system of claim 1, wherein the second target voltage is greater than or equal to a voltage sufficient to activate a starter for an internal combustion engine.

12. The energy storage system of claim 1, wherein the notification comprises a detectable reduced performance in an additional system connected to the energy storage system.

13. The energy storage system of claim 12, wherein the notification comprises an audibly detectible change in the performance of a starter within the additional system.

14. The energy storage system of claim 1, wherein the notification comprises an indicator device configured to receive a discrete output from the controller.

15. The energy storage system of claim 14, wherein the indicator device is configured to provide an indicator light or sound.

16. The energy storage system of claim 1, wherein the controller is configured to detect a temperature of the one or more capacitors.

17. The energy storage system of claim 16, wherein the controller is programmed to adjust the first target voltage to a third target voltage that varies as a linear function of temperature when the detected temperature condition is between an upper temperature condition and a lower temperature condition.

18. The energy storage system of claim 17, wherein the controller is configured to charge the capacitor system to a fourth target voltage that is approximately constant when the detected temperature condition is at least one of less than or equal to the lower temperature condition and greater than or equal to the upper temperature condition.

19. The energy storage system of claim 17, wherein the controller is configured to adjust the first target voltage to a sloping linear function of the detected temperature an approximately constant first voltage when the detected temperature falls at or below the target upper temperature and an approximately constant second voltage when the detected temperature.

20. A method of operating a capacitor-based energy storage system, comprising:
   providing a controller and a capacitor system comprising at least one capacitor;
   charging the at least one capacitor in the capacitor system with a charging circuit to a first target voltage;
   detecting a condition of the capacitor system with the controller;
   determining whether to put the capacitor system in a degraded state based on the condition;
   reducing the charge of the at least one capacitor to a second target voltage in response to the condition;
   providing a notification that the at least one capacitor is charged to the second target voltage, and
   balancing a plurality of capacitor output voltages with respect to each other, each capacitor output voltage extending across each of the plurality of capacitors.

21. The method of claim 20, wherein charging comprises charging the at least one capacitor with an approximately constant current.

22. The method of claim 20, wherein providing comprises providing a capacitor bank comprising a plurality of capacitors.

23. The method of claim 20, wherein detecting comprises detecting a change in voltage across at least one capacitor in the capacitor system.

24. The method of claim 23, wherein detecting comprises detecting a change in voltage due to at least one of a broken and shorted wire within the capacitor system.

25. The method of claim 20, wherein reducing comprises closing a switch within a balancing circuit.

26. An energy storage system, comprising:
a capacitor system comprising one or more capacitors;
a charging circuit configured to charge the capacitor system to a first target voltage; and
a controller configured to detect a temperature condition of the capacitor system, wherein the controller is programmed to charge the capacitor system to a second target voltage that varies as a function of temperature when the detected temperature condition is between an upper temperature condition and a lower temperature condition,
wherein the capacitor system comprises a plurality of capacitors, wherein the first target voltage is defined as a combined operating voltage across the plurality of capacitors.

27. The energy storage system of claim 26, wherein the controller is programmed to charge the capacitor system to a second target voltage that varies as a linear function of temperature when the detected temperature condition is between an upper temperature condition and a lower temperature condition.

28. The energy storage system of claim 26, wherein the controller is configured to charge the capacitor system to a third target voltage that is approximately constant when the detected condition is at least one of greater than or equal to the lower temperature condition or less than or equal to the upper temperature condition.

29. An energy storage system, comprising:
a capacitor system comprising one or more capacitors;
a charging circuit configured to charge the capacitor system to a first target voltage; and
a controller configured to detect a first condition and programmed, in response to the first condition, to instruct the charging circuit to charge the capacitor system to a second target voltage that is less than the first target voltage, and to provide a notification that the capacitor system is operating in a degraded state,
wherein the capacitor system comprises at least one sensor configured to detect the first condition, the sensor configured to communicate the first condition to the controller.

30. The energy storage system of claim 29, wherein the sensor is positioned on a capacitor to detect a temperature condition of the capacitor.

31. The energy storage system of claim 29, wherein the capacitor system comprises a capacitor bank comprising a plurality of capacitors and the energy storage system further comprises a balancing circuit configured to balance a plurality of capacitor output voltages with respect to each other, each capacitor output voltage extending across each of the plurality of capacitors.

32. An energy storage system, comprising:
a capacitor system comprising one or more capacitors;
a charging circuit configured to charge the capacitor system to a first target voltage;
a controller configured to detect a first condition and programmed, in response to the first condition, to instruct the charging circuit to charge the capacitor system to a second target voltage that is less than the first target voltage, and to provide a notification that the capacitor system is operating in a degraded state,
wherein the capacitor system comprises a capacitor bank comprising a plurality of capacitors; and
a balancing circuit configured to balance a plurality of capacitor output voltages with respect to each other, each capacitor output voltage extending across each of the plurality of capacitors.

33. The energy storage system of claim 32, wherein the second target voltage is greater than or equal to a voltage sufficient to activate a starter for an internal combustion engine.

34. The energy storage system of claim 32, wherein the notification comprises an indicator device configured to receive a discrete output from the controller.

35. The energy storage system of claim 32, wherein the controller is configured to detect a temperature of the one or more capacitors.

36. An energy storage system, comprising:
a capacitor system comprising one or more capacitors;
a charging circuit configured to charge the capacitor system to a first target voltage; and
a controller configured to detect a first condition and programmed, in response to the first condition, to instruct the charging circuit to charge the capacitor system to a second target voltage that is less than the first target voltage, and to provide a notification that the capacitor system is operating in a degraded state,
wherein the second target voltage is greater than or equal to a voltage sufficient to activate a starter for an internal combustion engine.

37. The energy storage system of claim 36, wherein the capacitor system comprises at least one sensor configured to detect the first condition, the sensor configured to communicate the first condition to the controller.

38. The energy storage system of claim 37, wherein the sensor is positioned on a capacitor to detect a temperature condition of the capacitor.

39. An energy storage system, comprising:
a capacitor system comprising one or more capacitors;
a charging circuit configured to charge the capacitor system to a first target voltage; and
a controller configured to detect a first condition and programmed, in response to the first condition, to instruct the charging circuit to charge the capacitor system to a second target voltage that is less than the first target voltage, and to provide a notification that the capacitor system is operating in a degraded state,
wherein the notification comprises a detectable reduced performance in an additional system connected to the energy storage system.

40. The energy storage system of claim 39, wherein the notification comprises an audibly detectable change in the performance of a starter within the additional system.

41. An energy storage system, comprising:
a capacitor system comprising one or more capacitors;
a charging circuit configured to charge the capacitor system to a first target voltage; and
a controller configured to detect a first condition and programmed, in response to the first condition, to instruct the charging circuit to charge the capacitor system to a second target voltage that is less than the first target voltage, and to provide a notification that the capacitor system is operating in a degraded state, wherein the notification comprises an indicator device configured to receive a discrete output from the controller.

42. The energy storage system of claim 41, wherein the sensor is positioned on a capacitor to detect a temperature condition of the capacitor.

43. An energy storage system, comprising:
a capacitor system comprising one or more capacitors;
a charging circuit configured to charge the capacitor system to a first target voltage; and
a controller configured to detect a first condition and programmed, in response to the first condition, to instruct the charging circuit to charge the capacitor system to a second target voltage that is less than the first target voltage, and to provide a notification that the capacitor system is operating in a degraded state,
wherein the controller is configured to detect a temperature of the one or more capacitors.

44. A method of operating a capacitor-based energy storage system, comprising:
providing a controller and a capacitor system comprising at least one capacitor;
charging the at least one capacitor in the capacitor system with a charging circuit to a first target voltage;
detecting a condition of the capacitor system with the controller;
determining whether to put the capacitor system in a degraded state based on the condition;
reducing the charge of the at least one capacitor to a second target voltage in response to the condition; and
providing a notification that the at least one capacitor is charged to the second target voltage,
wherein reducing comprises closing a switch within a balancing circuit.

45. The method of claim 44, wherein detecting comprises detecting a change in voltage across at least one capacitor in the capacitor system.

46. The method of claim 45, wherein detecting comprises detecting a change in voltage due to at least one of a broken and shorted wire within the capacitor system.

47. A method of operating a capacitor-based energy storage system, comprising:
providing a controller and a capacitor system comprising at least one capacitor;
charging the at least one capacitor in the capacitor system with a charging circuit to a first target voltage;
detecting a condition of the capacitor system with the controller;
determining whether to put the capacitor system in a degraded state based on the condition;
reducing the charge of the at least one capacitor to a second target voltage in response to the condition; and
providing a notification that the at least one capacitor is charged to the second target voltage,
wherein detecting comprises detecting a change in voltage across at least one capacitor in the capacitor system,
wherein detecting comprises detecting a change in voltage due to at least one of a broken and shorted wire within the capacitor system.

48. An energy storage system, comprising:
a capacitor system comprising one or more capacitors;
a charging circuit configured to charge the capacitor system to a first target voltage; and
a controller configured to detect a temperature condition of the capacitor system, wherein the controller is programmed to charge the capacitor system to a second target voltage that varies as a function of temperature when the detected temperature condition is between an upper temperature condition and a lower temperature condition,
wherein the controller is configured to charge the capacitor system to a third target voltage that is approximately constant when the detected condition is at least one of greater than or equal to the lower temperature condition or less than or equal to the upper temperature condition.

49. Energy storage system of claim 48, wherein the controller is programmed to charge the capacitor system to a second target voltage that varies as a linear function of temperature when the detected temperature condition is between an upper temperature condition and a lower temperature condition.

* * * * *